(No Model.)
I. A. FULLER.
WATER GAGE.
No. 444,295. Patented Jan. 6, 1891.
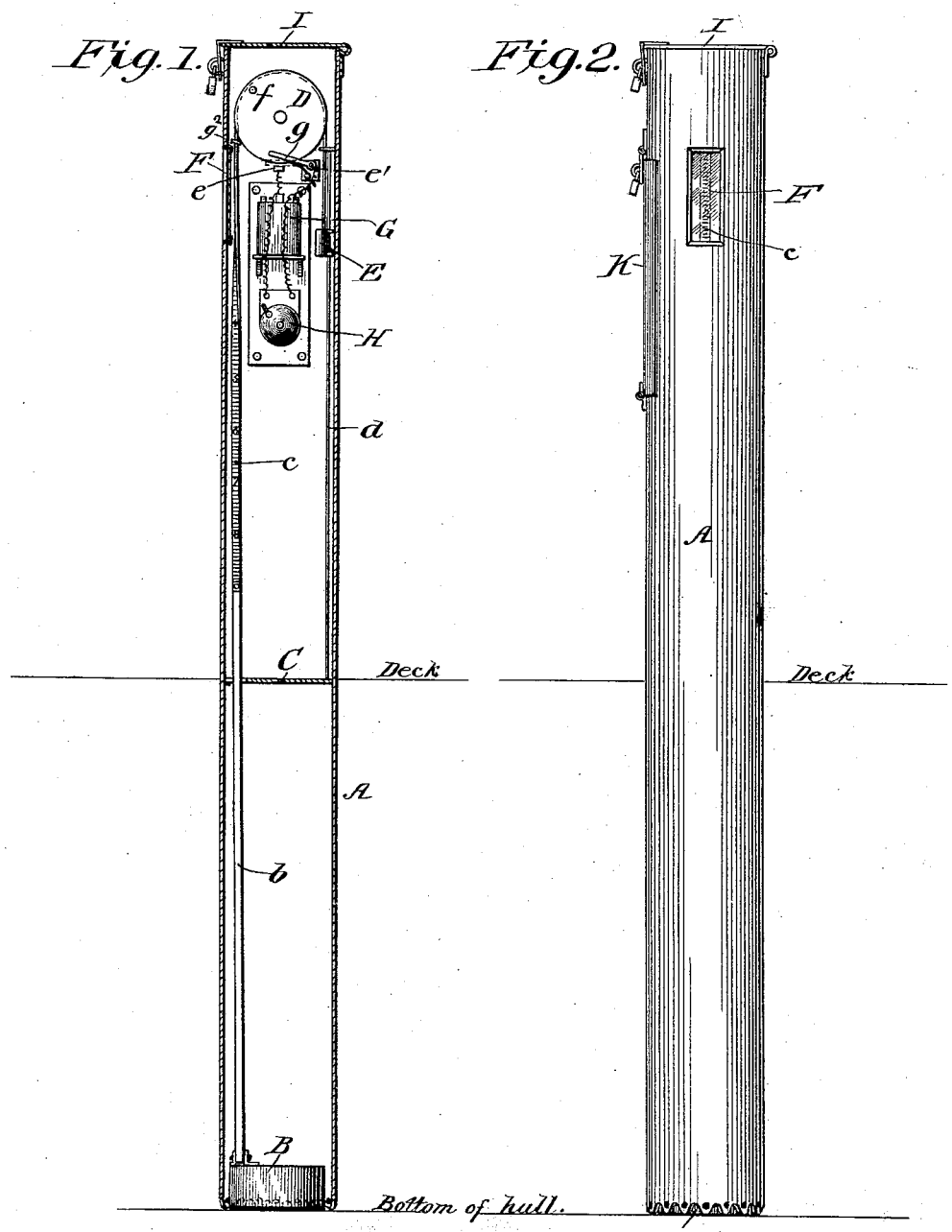
WITNESSES:
Fred G. Dieterich
Edw. W. Byrn.
INVENTOR:
Ira A. Fuller.
BY Munn & Co.
ATTORNEYS

UNITED STATES PATENT OFFICE.

IRA ALDRADO FULLER, OF PEPIN, WISCONSIN.

WATER-GAGE.

SPECIFICATION forming part of Letters Patent No. 444,295, dated January 6, 1891.

Application filed March 27, 1890. Serial No. 345,597. (No model.)

*To all whom it may concern:*

Be it known that I, IRA ALDRADO FULLER, of Pepin, in the county of Pepin and State of Wisconsin, United States of America, have invented a new and useful Improvement in Water-Level Indicators and Alarms, of which the following is a specification.

My invention is in the nature of an improved water-level indicator and alarm designed to give notice of the rise of water in the hold of a barge, ship, or other vessel from leakage, and thus save the loss of property and life liable to result therefrom.

My invention is based upon the general principle of a float contained in a vertical case and having attached a scale which appears at a window in the case as the water raises the float, and an electric bell and battery whose circuit is closed by the rising of the float.

My invention consists in the peculiar construction and arrangement of parts, which I will now proceed to describe with reference to the drawings, in which—

Figure 1 is a vertical longitudinal section of the device, and Fig. 2 is a side elevation.

A represents the inclosing case, which is preferably a cylindrical tube of sheet metal of about four inches diameter and of a length adapted to extend from the bottom of the hold of the vessel up to range of easy observation. This case A is perforated with holes at its lower end, so as to give access of water to its interior, and has within it, at its lower end, a float B, of some light material, which rises as the water-level rises. This float has a rod or stem $b$ attached to it and extending up through partition C, arranged transversely in the case for the purpose of guiding said stem and holding it in place. To the top of this stem is attached a graduated tape or flexible scale $c$, of leather, rubber, cloth, or metal, which passes up in front of a glazed window F, through which it may be seen from the exterior, and then through a guide $g^2$ and over a wheel or disk D, arranged upon an axis in the top of the case, the other end of the tape passing down upon the opposite side of the wheel and being attached to a counter-weight E, which serves to balance a part of the weight of the float and render it sensitive in rising with the water. This weight also serves in descending to take up the slack of the tape or flexible scale. To keep this weight from swaying about, it is provided with a guide-eye that slides over a small rod or wire $d$, arranged vertically within the case.

G is a galvanic battery, and H is a vibrating electric bell of the ordinary construction arranged in the battery-circuit, with the two terminals $e\ e'$ of the circuit arranged to be closed by a switch-bar $g$, which is struck and depressed by a trip-pin $f$ on the wheel D to close the circuit and ring an alarm whenever the float shall have been raised and the wheel D rotated by the rise of the water in the lower end of case A.

K is a hinged side door, and I is a hinged top door for giving access to the various parts of the device.

Having thus described my invention, what I claim as new, and desire to secure by Letters Patent, is—

1. The combination, with the outer case A, having transverse partitions C, of the float B, having stem $b$ extending through said partition, the pulley D, arranged in the upper end of the case, the flexible graduated tape $c$, attached at one end to the rod $b$ and passing over the pulley, the counterbalance-weight E, attached to the tape and provided with guide-eyes, and the guide-rod $a$, having a sliding connection with the weight, substantially as shown and described.

2. The combination of the outer case having glazed window F, doors I and K, and partition C, the float B, having rod $b$ passing through the partition, the pulley D, arranged in the top of the case and provided with trip-pin $f$, the tape $c$, attached to rod $b$ and passing over the pulley D and having counterbalance-weight E, with guide-rod $d$, and an electric circuit and bell with closing-switch $g$, arranged to be struck by the pin $f$ of the pulley D, substantially as shown and described.

IRA ALDRADO FULLER.

Witnesses:
CHAS. PETERSON,
H. C. FULLER.